United States Patent
Macy et al.

(10) Patent No.: US 6,538,691 B1
(45) Date of Patent: Mar. 25, 2003

(54) SOFTWARE CORRECTION OF IMAGE DISTORTION IN DIGITAL CAMERAS

(75) Inventors: William Macy, Palto Alto, CA (US); Oleg Rashkovskiy, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/235,136

(22) Filed: Jan. 21, 1999

(51) Int. Cl.$^7$ .............................................. H04N 5/235
(52) U.S. Cl. .................... 348/222.1; 348/241; 382/293
(58) Field of Search ............................. 348/222.1, 241, 348/250; 382/276, 293, 294, 300

(56) References Cited

U.S. PATENT DOCUMENTS

| | | | |
|---|---|---|---|
| 4,178,075 A | 12/1979 | Rogers | |
| 4,746,985 A | 5/1988 | Waldron et al. | |
| 5,175,808 A | * 12/1992 | Sayre | 382/293 |
| 5,276,519 A | * 1/1994 | Richards et al. | 348/241 |
| 5,461,440 A | 10/1995 | Toyoda et al. | |
| 5,465,121 A | 11/1995 | Blalock et al. | |
| 5,675,380 A | * 10/1997 | Florent et al. | 348/251 |
| 5,796,426 A | * 8/1998 | Gullichsen et al. | 382/293 |
| 5,798,923 A | * 8/1998 | Laskowski | 364/420 |
| 5,818,527 A | * 10/1998 | Yamaguchi et al. | 348/241 |
| 5,940,544 A | * 8/1999 | Nako | 382/293 |
| 6,035,075 A | * 3/2000 | Inoue et al. | 382/293 |
| 6,061,477 A | * 5/2000 | Lohmeyer et al. | 382/293 |
| 6,285,410 B1 | * 9/2001 | Marni | 348/576 |

OTHER PUBLICATIONS

"Numerical Recipes in C", The Art of Scientific Computing Second Edition; William H. Press, Saul A. Teukolsky, William T. Vetterling, Brian P. Flannery; Cambridge University Press; Chapter 9, pp. 350–367.

"Principles of Optics", Electromagnetic Theory of Propagation, Interference and Diffraction of Light; Max Born; Max Born, Emil Wolf; Pergamon Press, Sixth (Corrected) Edition; Chapter 5, pp. 203–217.

William H. Press, Saul A. Teukolsky, William T. Vetterling, and Brian P. Flannery, "Numerical Recipes in C: The Art of Scientific Computing Second Edition", Cambridge University Press, 1988, 1992, pp. 350–354, pp. 362–367.

M. Born and E. Wolf, "Principles of Optics, Electromagnetic Theory of Propagation, Interference and Diffraction of Light", Pergamon Press Inc., 1980, pp. xi–xx, 203–217.

* cited by examiner

Primary Examiner—Wendy R. Garber
Assistant Examiner—Jacqueline Wilson
(74) Attorney, Agent, or Firm—Blakely, Sokoloff, Taylor & Zafman LLP

(57) ABSTRACT

A digital image processing method and apparatus corrects geometrical distortions in digital images. The method includes the calibration of the camera by choosing a test pattern and manually adjusting the distortion correction factor of the camera until the image appears to be undistorted. A real image is then captured by the camera grid. The camera grid is then distorted by the same distortion factor such that the image is corrected, but the image contour is deformed. Based on the distortion correction factor, a respective location in the camera grid is determined for each pixel in a display window. An intensity value to each pixel in the display window is assigned based on one or more pixels in the camera grid indicated by the location. The points for mapping camera values to the display window need to be determined only once for a given image size. All subsequent distorted images having the same size are corrected using interpolation and pre-compiled points.

24 Claims, 3 Drawing Sheets

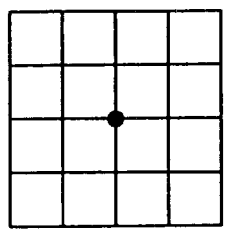
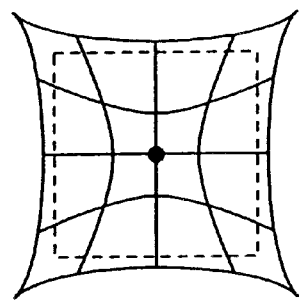
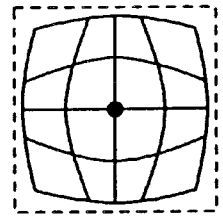
FIG. 1A  FIG. 1B  FIG. 1C
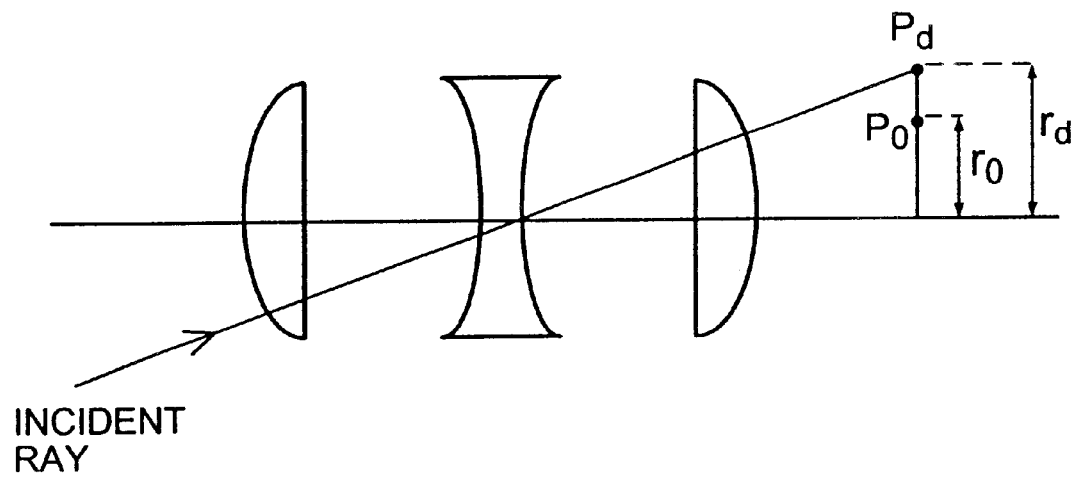
FIG. 2

US 6,538,691 B1

SOFTWARE CORRECTION OF IMAGE DISTORTION IN DIGITAL CAMERAS

FIELD OF THE INVENTION

The present invention relates to the field of digital image processing, and more specifically to distortion correction in digital images.

BACKGROUND OF THE INVENTION

Digital cameras are used for still photography and videography and the captured digital images may be transferred to an image display device such as a monitor. Due to imperfections and natural limitations of cameras' optical systems, the digital images displayed on a monitor may show geometrical distortions. Geometrical distortions are a class of optical aberrations that occur when the object is not situated on the optical axis of the camera's lens system. Geometrical distortions depend on the angle that a ray incident on the lens makes with the optical axis. FIG. 1B illustrates a positive distortion (also called pincushion distortion) of the object illustrated in FIG. 1A, while FIG. 1C illustrates a negative distortion (also called barrel distortion) of the same object.

Geometrical distortions can be alleviated by equipping the camera with a more complicated, higher quality lens system. However, using a higher quality lens can substantially increase the camera's weight, size, and cost.

Another method for compensating geometrical distortions in images is generating magnetic fields by positioning magnets or magnetic coils around the screen of an image display device.

Both solutions necessitate the physical and functional alteration of either the camera or the display device used to view the images.

SUMMARY OF THE INVENTION

A method and apparatus are disclosed for recreating an image free of geometrical distortion from a distorted image captured by a camera, wherein the distorted image is represented by a set of pixels in a camera grid. A distortion correction factor is determined such that, when applied to the camera grid, causes distortion in the distorted image to be substantially removed. Based on the distortion correction factor, a respective location in the camera grid is identified for each pixel in a display window. An intensity value to each pixel in the display window is assigned based on one or more pixels in the camera grid indicated by the location.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which:

FIG. 1a illustrates a object represented by a rectangular grid;

FIG. 1b illustrates a pincushion distortion in a rectangular grid image;

FIG. 1c illustrates a barrel distortion in a rectangular grid image;

FIG. 2 illustrates the a real image point and a distorted image point;

DETAILED DESCRIPTION

Figure 3:
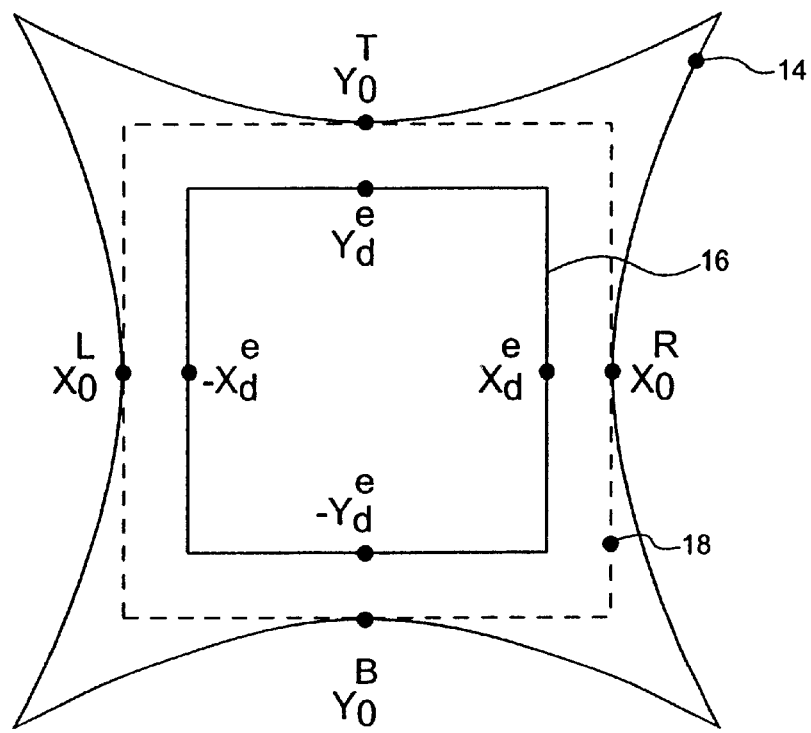
FIG. 3 illustrates the boundaries of the distorted camera grid, the camera grid, and the display window.

A method and apparatus for correcting geometrical distortions in digital images is disclosed. In the following description, numerous specific details are set forth such as specific computational methods, equations, parameters, etc. in order to provide a thorough understanding of the present invention. It will be obvious, however, to one skilled in the art that these specific details may not be needed in order to practice the present invention. In other instances, well-known processing steps have not been described in detail in order to avoid unnecessarily obscuring the present invention.

When images are captured on a digital camera, they may be distorted due to the object location with respect to the optical axis of the camera. FIG. 2 illustrates an incident ray coming from an off-axis object and passing through a lens system. In order to determine the location of the distorted image, ray tracing of an incident ray emerging from an off-axis object point is performed. Point $P_d$ is the distorted point and point $P_0$ is the correct location of the captured object point if there were no distortion. The distance $r_0$ is determined to be the distance from the point $P_0$ to the optical axis of the lens system, and $r_d$ is the distance from the distorted point $P_d$ to the optical axis of the system. The deviation from the ideal point $P_0$ to the distorted point $P_d$ is the distance $\Delta r$. Therefore, the location of the distorted point $P_d$ is determined by equation (1)

$$r_d = r_0 + \Delta r = r_0 + C r_0^3 \qquad (1)$$

The parameter C represents a distortion correction factor characteristic of the camera being used. In the case of barrel distortion, parameter C assumes a negative value, while in the case of pincushion distortion, parameter C assumes a positive value.

The value of the parameter C of a camera can be found by using the following camera calibration method: the user may choose a test pattern, such as a rectangle or grid, then capture the test pattern in the camera; the captured test image may be displayed on a image display device such as a monitor; the user may then manually adjust parameter C until the image displayed does not appear to have any geometrical distortions, i.e. curved lines (that should be straight if there were no distortion) appear to be straight. The parameter C can be manually adjusted, for example, using a software implemented tool such as a scroll bar. In another embodiment of the present invention, the parameter C is adjusted by dragging a corner of the test image radially from the center of the image, operation that also changes the positions of all the other corners of the image, such that the contour of the image is deformed but the content of the image is corrected.

There is a direct relationship between the level of distortion of the image and the parameter C. The magnitude of the parameter C depends on the incident angle between the object and the optical axis of the lens system. A large incident angle corresponds to a high level of distortion and subsequently, to a high absolute value of the parameter C.

Generally, the parameter C for a given camera does not change. It is sufficient that the parameter C is determined only once for a specific camera. As such, the parameter C may be determined during the factory development of a specific camera, thus a user may find the camera calibration method optional.

Digital cameras collect light with sensors and the content of these sensors is stored on a rectangular grid. Similar to a computer monitor, the intensity values of the pixels which describe the image are known at discrete points on the camera grid. The correction of digital images is facilitated by the similarity between a camera grid and a monitor grid. This similarity allows the process of mapping the values of the discrete pixels of the monitor grid onto the discrete points of the camera grid, or vice-versa. It is to be noted that the mapping process does not require that the number of monitor pixels equals the number of camera points.

The present invention corrects geometrical distortion by using the following stages: first, the camera grid is distorted in order to achieve a corrected (undistorted) image, in other words, the contour of the image is deformed, while the content of the image is corrected; second, the monitor grid pixels are mapped onto the camera grid points. Although the reverse process, which is mapping the distorted camera grid points on the monitor grid pixels, can be effectuated, it entails a much more complicated computational algorithm, because the camera grid points are not equally spaced once the camera grid is distorted. The computational complexity increases when it is required to find the location of a monitor point in a camera grid that is not equally spaced.

FIG. 3 illustrates the rectangular camera grid 16 which has the distorted image, the distorted camera grid 14 which has the corrected image, and the monitor window 18. In one preferred embodiment, the monitor window 18 is the maximal display window that can be placed within the boundaries of the distorted camera grid 14. Four Cartesian coordinates for the camera grid 16 are chosen: $X_d^e, -X_d^e, Y_d^e$, and $-Y_d^e$. These magnitudes represent the distance between the origin of the coordinate system and the left, right, top, and bottom edges, respectively, of the camera grid 16. The superscript "e" refers to the edges of the camera grid, while subscript "d" refers to the distorted points in the camera grid 16. Similarly, the four coordinates in the monitor grid are: $X_0^L, X_0^R, Y_0^T$, and $Y_0^B$. These magnitudes represent the distance between the optical axis of the system and the left, right, top and bottom boundaries of the monitor grid.

The optical axis passes through the point $(O_x, O_y)$ of the captured image. In contrast, the origin of the coordinate system coincides with the center of the camera grid and the center of the captured image. If the distortion is symmetric about the center of the camera image, then the point $(O_x, O_y)$ is the center of the coordinate system and the optical axis coincides with the origin of the coordinate system. Therefore, the boundaries of the camera rectangle are always symmetrical about the coordinate system, but the boundaries of the monitor rectangle are not symmetrical about the coordinate system if the optical axis does not pass through the origin of the coordinate system.

Since the four coordinates of the camera grid are known, the boundaries $X_0^L, X_0^R, Y_0^T$, and $Y_0^B$ of the maximal display window 18 can be found using equation (1).

The magnitude $X_0^L$ is determined by substituting $r_d$ with $-X_d^e$ and $r_0$ with $(X_0^L-O_x)$ in equation (1), resulting in equation (2a).

$$-X_d^e = (X_0^L - O_x) + C(X_0^L - O_x)^3 \quad (2a)$$

Similarly, the magnitude $X_0^R$ is determined by substituting $r_d$ with $X_d^e$ and $r_0$ with $(X_0^R - O_x)$ in equation (1), resulting in equation (2b).

$$X_d^e = (X_0^R - O_x) + C(X_0^R - O_x)^3 \quad (2b)$$

The magnitude $Y_0^T$ is determined by substituting $r_d$ with $Y_d^e$ and $r_0$ with $(Y_0^T - O_y)$ in equation (1), resulting in equation (2c).

$$Y_d^e = (Y_0^T - O_y) + C(Y_0^T - O_y)^3 \quad (2c)$$

The magnitude $Y_0^B$ is determined by substituting $r_d$ with $-Y_d^e$ and $r_0$ with $(Y_0^B - O_y)$ in equation (1), resulting in equation (2b).

$$Y_d^e = (Y_0^B - O_y) + C(Y_0^B - O_y)^3 \quad (2d)$$

Equations (2a) through (2d) are solved using a numerical or analytical technique in order to obtain the magnitudes $X_0^L, X_0^R$, and $Y_0^B$.

The abscissas $X_0$ of the monitor grid are equally spaced in between the calculated magnitudes $X_0^L$ and $X_0^R$, while the ordinates $Y_0$ of the monitor grid are equally spaced in between the calculated magnitudes $Y_0^T$ and $Y_0^B$.

Once the discrete points $(X_0, Y_0)$ of the maximal display window are determined, the corrected image of the distorted camera grid is reconstructed by mapping the equally spaced monitor grid points onto the unknown camera grid points $(X_d, Y_d)$ of the original image where the intensity values are known. Based on the distortion correction factor, a respective location in the camera grid is identified for each pixel in a display window.

Figure 4:
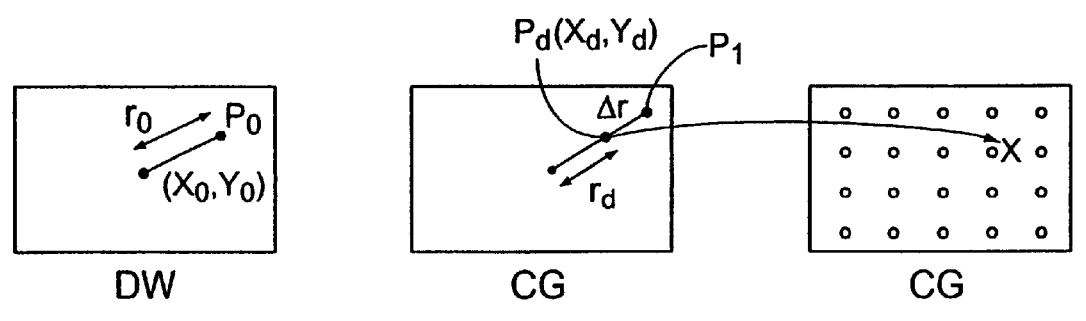
FIG. 4 illustrates the method of distortion correction.

Assuming that the distortion is radial from the optical axis, the points $(X_0, Y_0)$, $(X_d, Y_d)$, and $(O_x, O_y)$ all lie on the same line. Referring to FIG. 4, $r_0$ represents the distance between the optical axis and a chosen point $P_0$ in the display window DW. The point $P_d$ is the respective adjusted location in the camera grid CG of the point $P_0$ after the image has been corrected. The segment $r_d$ represents the distance between the optical axis and the point $P_d$. The point $P_1$ in the camera grid CG represents the same location of $P_0$ if there were no distortion, i.e. the parameter C is equal to zero. The quantity $\Delta r$ is the displacement vector that is used to offset the point $P_1$ to a location $P_d$ based on the distortion correction factor. The array of points on the camera grid $(X_d, Y_d)$ are determined by computing, for each point $(X_0, Y_0)$ of the display window DW, the corresponding displacement vector $\Delta r$, offsetting the display window point to a location $P_d$ in the camera grid based on the value of the displacement vector, and interpolating between pixels surrounding $P_d$ to determine a pixel intensity value to be displayed at point $(X_0, Y_0)$ in the display window DW.

As such, the array of points $(X_d, Y_d)$ can be determined using the equation of a line and equation (1). Using the equation of a line, $X_d$ and $Y_d$ can be expressed using the relationship:

$$Y_d = MX_d + b \quad (3)$$

where parameter m represents the slope of the line and parameter b is a constant. The parameter m is given by the equation (4a), while the parameter b is given by the equation (4b):

$$m = (Y_0 - O_y)/(X_0 - O_x) \quad (4a)$$

$$b = O_y - O_x m \quad (4b)$$

Using the Pythagorean theorem, equation (1) can be expressed in terms of "$X_d$" and "$Y_d$" coordinates, giving equation (5):

$$r_d^2 = X_d^2 + Y_d^2 (r_0 + Cr_0^3)^2 = A \quad (5)$$

Substituting $Y_d$ from equation (3) into equation (5) results in equation (6):

$$(m^2+1) X_d^2 + 2\ mbx_{d+(b^2-A)} = 0 \quad (6)$$

Equations (3) and (6) form a system of equations that may be numerically or analytically solved in order to find the array of camera grid points ($X_d$, $Y_d$). For example, equation (6) may be solved for $X_d$ using the quadratic formula, while $Y_d$ may be found using equation (3) and the result derived from equation (6).

The intensity value at each point ($X_d$, $Y_d$) is obtained by interpolating the neighboring known values of the original image points in the camera grid. The pixel intensity value at a chosen monitor grid point ($X_0$, $Y_0$) is given by the intensity at its corresponding camera grid point ($X_d$, $Y_d$). The preferred interpolation method is cubic spline interpolation, however other interpolation methods, including linear interpolation, logarithmic interpolation, Lagrange interpolation, and so forth, may be used in order to obtain the pixel intensity values.

It is to be noted that the set of camera grid points ($X_d$, $Y_d$) need only be computed once for a given image size. After the monitor grid points are known, All subsequent distorted images having the same size are corrected using interpolation and pre-compiled camera grid points ($X_d$, $Y_d$). The default corrected image size is same as camera grid size, however the user may select a different size for the corrected image.

Figure 5:
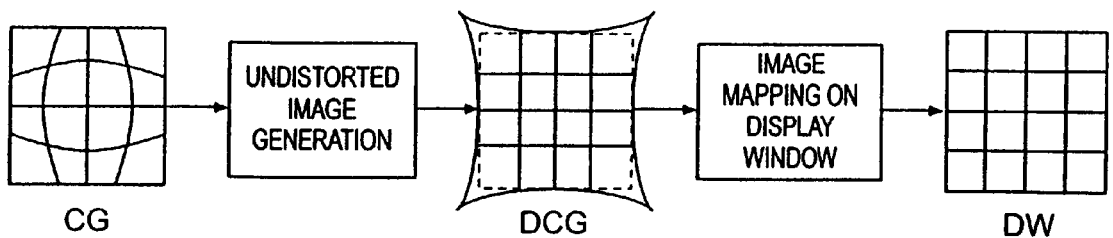
FIG. 5 illustrates a flowchart of the distortion correction method.

FIG. 5 is a flowchart showing a sequence of operations according to the present invention. The rectangular camera grid CG shows a distorted image. While estimating the parameter C, the camera grid CG is distorted in order to create a corrected image. A maximal display window, illustrated with dash lines, is generated to fit within the boundaries of the distorted camera grid DCG. Next, the display window DW points are mapped onto the camera grid CG points and the intensity of the pixels of the display window are found by interpolating the values from the original image points of the camera grid. The result is a rectangular undistorted image.

Figure 6:
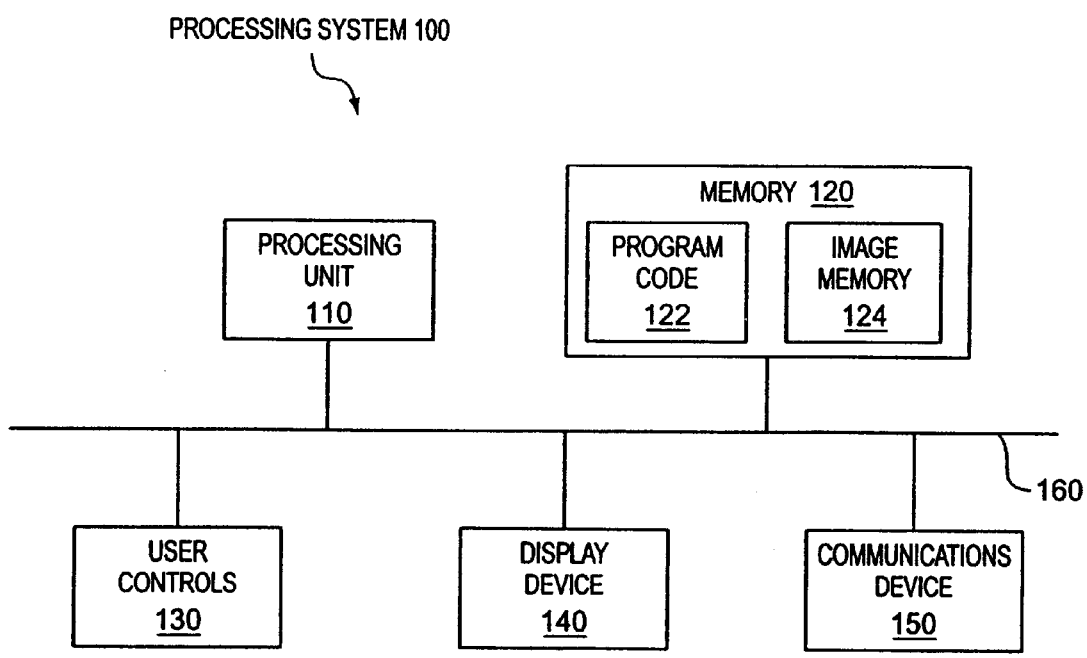
FIG. 6 illustrates a block diagram of a processing system that can be used to perform processing operations used in embodiments of the present invention.

FIG. 6 is block diagram of a processing system 100 that can be used to perform processing operations used in embodiments of the present invention. The processing system 100 includes a processing unit 110, memory 120, user controls 130, display device 140, and communications device 150, each connected to a bus structure 160.

The processing unit 110 may include one or more general purpose processors, one or more digital signal processors, or any other devices capable of executing a sequence of instructions.

The memory 120 may include system memory, non-volatile storage devices, and removable storage media. The removable storage media may be, for example, a compact disk, floppy disk, or other removable storage devices. Image memory 124, and program code 122, including sequences of instructions for performing the above-described distortion correction operations, may be stored on a removable storage media that can be read by the processing system 100 and used to operate the processing system in accordance with embodiments described herein. The non-volatile storage device may be a device such as magnetic tape, magnetic disk, optical disk, electrically erasable programmable read only memory (EEPROM), or any other computer-readable medium.

The user controls 130 may be a mouse, keyboard, trackball, stylus, or any other device for manipulating the image and other elements displayed on the display device 140.

The communications device 150 may be a modem, area network card or any other device for coupling the processing system 100 to a computer is network. The communications device may be used to generate or receive a carrier wave modulated with a data signal, for example, for obtaining images or text from a server computer on the World Wide Web or other network, or for receiving updated program code or function-extending program code that can be executed by the processing unit to implement embodiments of the present invention.

In one embodiment of the present invention, the processing system 100 described above may be a general purpose computer system. However, embodiments of the present invention are not limited in their applications to a computer system. As such, the above method may be executed by a processing system 100 embedded in a digital camera. The camera may be used for both still photography or videography. Following the method described above, the calibration of the camera can be achieved by manually adjusting the distortion factor C using camera built-in user controls 130. The user controls of a camera may be buttons or slides. The picture may be stored in the memory 120, and it may be displayed on the camera built-in image display unit 140. The equations mentioned above may be embedded in the program code 122 of the camera, such that the camera itself corrects the images, without the need of a separate, external computer and monitor. Additionally, the above method may be embedded inside a photo kiosk, where the display unit 140 and the user controls 130 may be implemented by a touch sensitive screen.

In one embodiment, when power is applied to the processing system 100, the program code is loaded from non-volatile storage or removable storage into system memory by the processing unit 110. Sequences of instructions, including the above-described distortion correction operations, are then executed by processing unit 110.

Having described a processing system for implementing embodiments of the present invention, it should be noted that the individual processing operations described above may also be performed by specific hardware components that contain hard-wired logic to carry out the recited operations or by any combination of programmed processing components and hard-wired logic. Nothing disclosed herein should be construed as limiting the present invention to a single embodiment herein the recited operations are performed by a specific combination of hardware components.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for recreating an image free of geometrical distortion from a distorted image captured by a camera, wherein the distorted image is represented by a set of pixels in a camera grid, the method comprising:

determining a distortion correction factor that, when applied to the camera grid, causes distortion in the distorted image to be substantially corrected;

adjusting the shape of the camera grid to correct the content of the distorted image, wherein adjusting the shape of the camera grid results in a distorted camera grid;

identifying, based on the distortion correction factor, a respective location in the camera grid for each pixel in a display window; and assigning an intensity value to each pixel in the display window based on one or more pixels in the camera grid indicated by the location.

2. The method as described in claim 1, wherein determining a distortion correction factor comprises prompting a user to provide input to distort a contour of the image displayed on the display window to correct the geometrical distortion of the image, wherein distorting a contour of the image indicates the distortion correction factor.

3. The method as described in claim 1, wherein assigning an intensity value to each pixel in the display window comprises determining the intensity of the pixels in the camera grid by using an interpolation technique selected from the group consisting of: linear interpolation, cubic spline interpolation, Lagrange interpolation, and logarithmic interpolation.

4. A method for recreating an image free of geometrical distortion from a distorted image captured by a camera, wherein the image is represented by a set of pixels in a camera grid, the method comprising:
  adjusting the shape of the camera grid to correct the content of the distorted image, wherein adjusting the shape of the camera grid results in a distorted camera grid;
  for each selected pixel in a display window, computing a displacement vector between the selected pixel in the display window and a corresponding pixel in the camera grid based on a difference between the distorted camera grid and the camera grid; and
  assigning an intensity to each selected pixel in the display window based on at least one pixel in the camera grid that is offset from the corresponding pixel in the camera grid according to the displacement vector.

5. The method as described in claim 4, wherein adjusting the shape of the camera grid is performed by dragging a corner of the image radially to the center of the image until the image is corrected.

6. The method as described in claim 4, wherein adjusting the shape of the camera grid is performed by using a software implemented tool.

7. The method as described in claim 6, wherein the software implemented tool is a scroll bar.

8. The method as described in claim 4, wherein assigning an intensity to each selected pixel in the display window comprises determining the intensity of the pixels in the camera grid by using an interpolation technique selected from the group consisting of: linear interpolation, cubic spline interpolation, Lagrange interpolation, and logarithmic interpolation.

9. An article of manufacture including one or more computer readable media that embody a program of instructions for correcting a geometrical distortion in a distorted image captured by a camera, wherein the program of instructions, when executed by a processing unit, causes the processing unit to:
  prompt a user to provide input to distort a contour of the distorted image displayed on an image display device to correct the geometrical distortion of the distorted image, wherein distorting a contour of the image indicates a distortion correction factor and results in an image having a distorted contour;
  identify, based on the distortion correction factor, a respective location in the distorted image for each pixel in a display window; and
  recreate an image free of the geometrical distortion from a distorted image by assigning an intensity value to each pixel in the display window based on one or more pixels in the distorted image indicated by the location; and
  display an image free of geometrical distortion.

10. The article of manufacture as described in claim 9, wherein recreate an image free of geometrical distortion from a distorted image includes determining the intensity of the pixels in the display window from the interpolation of corresponding neighboring pixels of the distorted image.

11. A method for correcting a geometrical distortion in an image, wherein the method comprises:
  prompting a user to provide input to distort a contour of the image displayed on an image display device to correct the geometrical distortion in the image, wherein distorting a contour of the image indicates a distortion correction factor and results in an image having a distorted contour;
  adjusting the distortion correction factor in response to the user input to correct the geometrical distortion in the image.

12. The method as described in claim 11, wherein the distortion correction factor is adjusted by dragging a corner of the image radially to the center of the image until the image is corrected.

13. The method as described in claim 11, wherein the distortion correction factor is adjusted by using a software implemented tool.

14. The method as described in claim 13, wherein the software implemented tool is a scroll bar.

15. An article of manufacture including one or more computer readable media that embody a program of instructions for correcting a geometrical distortion in a distorted image captured by a camera and represented by a camera grid, wherein the program of instructions, when executed by a processing unit, causes the processing unit to:
  determine a distortion correction factor that, when applied to the camera grid, causes distortion in the distorted image to be substantially corrected;
  adjust the shape of the camera grid to correct the content of the distorted image, wherein adjusting the shape of the camera grid results in a distorted camera grid;
  identify, based on the distortion correction factor, a respective location in the camera grid for each pixel in a display window; and
  assign an intensity value to each pixel in the display window based on one or more pixels in the camera grid indicated by the location.

16. The method as described in claim 15, wherein determining a distortion correction factor comprises prompting a user to provide input to distort a contour of the image displayed on the display window to correct the geometrical distortion of the image, wherein distorting a contour of the image indicates the distortion correction factor.

17. The method as described in claim 15, wherein assigning an intensity value to each pixel in the display window comprises determining the intensity of the pixels in the camera grid by using an interpolation technique selected from the group consisting of: linear interpolation, cubic spline interpolation, Lagrange interpolation, and logarithmic interpolation.

18. An apparatus comprising:
  user controls which allow a user to distort a contour of a distorted image displayed on an image display device to correct a geometrical distortion in the distorted image, wherein distorting the contour of the distorted image results in an image having a distorted contour;

a processing unit comprising one or more processors; and one or more memories coupled to said one or more processors, said one or more memories having stored therein a program code which, when executed by said one or more processors, causes said one or more processors to:

perform an iterative adjustment of a distortion correction factor that, when applied to the distorted image, causes distortion in the distorted image to be substantially corrected;

identify, based on the distortion correction factor, a respective location in the distorted image for each pixel in a display window; and recreate an image free of geometrical distortion from a distorted image by assigning an intensity value to each pixel in the display window based on one or more pixels in the distorted image indicated by the location.

19. The apparatus as described in claim 18, wherein said recreate an image free of geometrical distortions from a distorted image includes determining the intensity of the pixels in the display window from the interpolation of the corresponding neighboring pixels of the distorted image.

20. The apparatus as described in claim 18 further comprises an image display unit.

21. The apparatus as described in claim 20, wherein the apparatus is a camera.

22. The apparatus as described in claim 20, wherein the apparatus is a computer system.

23. The apparatus as described in claim 20, wherein the apparatus is a photo kiosk.

24. The apparatus as described in claim 21, wherein said camera further comprises an optical lens system for capturing an image.

* * * * *

UNITED STATES PATENT AND TRADEMARK OFFICE
CERTIFICATE OF CORRECTION

PATENT NO. : 6,538,691 B1
DATED : March 25, 2003
INVENTOR(S) : Macy et al.

It is certified that error appears in the above-identified patent and that said Letters Patent is hereby corrected as shown below:

Column 4,
Line 51, delete "$Y_d=MX_d+b$", insert -- $Y_d=mX_d+b$ --.
Line 64, delete "$r_d^2=X_d^2+Y_d^2$ $(r_0 + Cr_0^3)^2=A$", insert -- $r_d^2=X_d^2+Y_d^2=(r_0 + Cr_0^3)^2=A$ --.

Signed and Sealed this

Twelfth Day of August, 2003

JAMES E. ROGAN
*Director of the United States Patent and Trademark Office*